(12) United States Patent
Dautartas et al.

(10) Patent No.: US 6,782,182 B2
(45) Date of Patent: Aug. 24, 2004

(54) OPTICAL FIBER ATTACHED TO A SUBSTRATE

(75) Inventors: Mindaugas F. Dautartas, Blacksburg, VA (US); Martin G. Meder, Blacksburg, VA (US)

(73) Assignee: Shipley Company, L.L.C., Marlborough, MA (US)

( * ) Notice: Subject to any disclaimer, the term of this patent is extended or adjusted under 35 U.S.C. 154(b) by 72 days.

(21) Appl. No.: 10/126,938

(22) Filed: Apr. 19, 2002

(65) Prior Publication Data

US 2002/0181880 A1 Dec. 5, 2002

Related U.S. Application Data

(60) Provisional application No. 60/285,906, filed on Apr. 23, 2001.

(51) Int. Cl.[7] .................................................. G02B 6/00
(52) U.S. Cl. ...................................... 385/137; 385/136
(58) Field of Search ................................ 385/136–137, 385/76–77, 52

(56) References Cited

U.S. PATENT DOCUMENTS

| | | | |
|---|---|---|---|
| 5,481,633 A | * | 1/1996 | Mayer .......................... 385/49 |
| 5,889,914 A | | 3/1999 | Gentsu |
| 6,442,312 B1 | * | 8/2002 | Terao et al. ................... 385/37 |

* cited by examiner

*Primary Examiner*—Ellen E. Kim
(74) *Attorney, Agent, or Firm*—Jonathan D. Baskin

(57) ABSTRACT

The invention includes an optical fiber device, comprising at least one optical fiber over a substrate, at least one reentrant shape in the substrate adjacent to the optical fiber and a polymer that at least partially encapsulates the optical fiber and attaches the optical fiber to the at least one reentrant shape and methods for making the same.

20 Claims, 2 Drawing Sheets

OPTICAL FIBER ATTACHED TO A SUBSTRATE

This application claims the benefit of Provisional Application No. 60/285,906, filed Apr. 23, 2001.

This invention relates to fiber optics devices.

BACKGROUND

Techniques for making fiber optic devices often include bonding a fiber to a substrate. A fiber is laid into a silicon substrate containing a V-groove to align the fiber. The fiber is then bonded in place by applying an adhesive like epoxy or a UV-cure acrylic and curing. The adhesive often contains a silane coupling agent like (3-glycidoxypropyl) trimethoxysilane in order to produce a reliable bond to a native or grown oxide on the surface of the silicon by hydrolyzing and condensing with the pendant hydroxyl groups on the native oxide. Cross linking of the silane is further augmented by exposure to atmospheric moisture. This chemical adhesion process is fraught with problems in adapting it to high-speed manufacturing, such as susceptibility to surface contamination, correct epoxy mix ratios, length of cure time and the like.

SUMMARY

The invention includes an optical fiber device, comprising at least one optical fiber over a substrate, at least one reentrant shape in the substrate adjacent to the optical fiber and a polymer that at least partially encapsulates the optical fiber and attaches the optical fiber to the at least one reentrant shape and methods for making the same.

DETAILED DESCRIPTION OF THE INVENTION

The present invention includes an optical fiber device, comprising at least one optical fiber over a substrate, at least one reentrant shape in the substrate adjacent to the optical fiber and a polymer that at least partially encapsulates the optical fiber and attaches the optical fiber to the at least one reentrant shape.

The fiber may be positioned on the substrate (like silicon) by laying the fiber in a V-, U-, or other shaped groove in the substrate or the fiber may be tensioned in place by external fixturing. V- and U-grooves may be formed by potassium hydroxide etching of 100 silicon wafers, for example.

The reentrant shapes may be created by masking the substrate with photoresist, patterning and etching openings adjacent to the fiber location and then performing isotropic dry or wet etching. Isotropic etching of silicon wafers may be performed with deep reactive ion etching or wet etches, for example. Isotropic etching causes the reentrant shapes to be undercut, reducing the tendency of polymer filling the reentrant shapes to pull out of the reentrant shapes. The underside of the substrate may also be provided with reentrant shapes so that arrays of fibers can be stacked to form 2-D arrays. The reentrant shapes may be created from circular, square or any other openings in the photoresist. It is, however, desirable that if the shapes are parallel the groove, that they be discontinuous or smaller in width than the groove to minimize the fibers tendency to misalign by sitting in the reentrant shapes instead of the groove.

The polymer is positioned over the fiber and substrate and pushed around the fiber and into the reentrant shapes by a heated or ultrasonic platen, for example. The polymer may be provided as an automatically fed thermoplastic tape, which is cut off after bonding. The polymer may also be provided as a thermoset B-stage preform. Multiple substrates can be bonded simultaneously, if stacked with intervening polymer layers and if the substrates are provided with reentrant shapes on the underside of the substrate as well as the top of the substrate.

Figure 1:
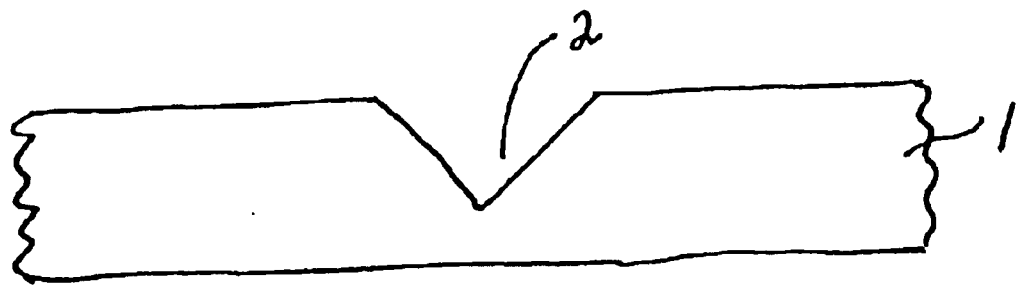
FIG. 1 shows a substrate with a V-groove, for one embodiment of the invention.
Figure 2:
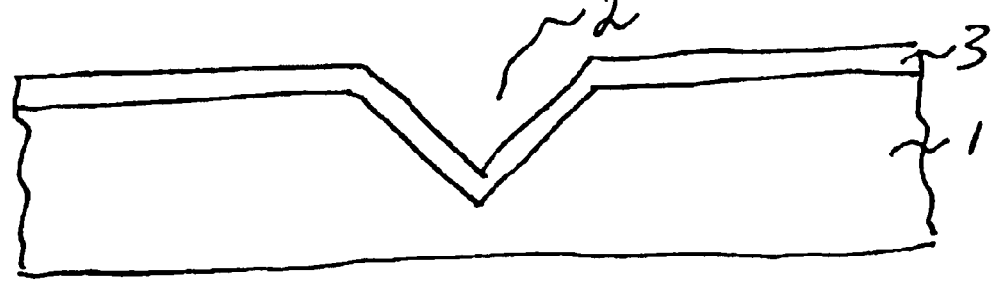
FIG. 2 shows the substrate with a layer of deposited photoresist, for one embodiment of the invention.
Figure 3:
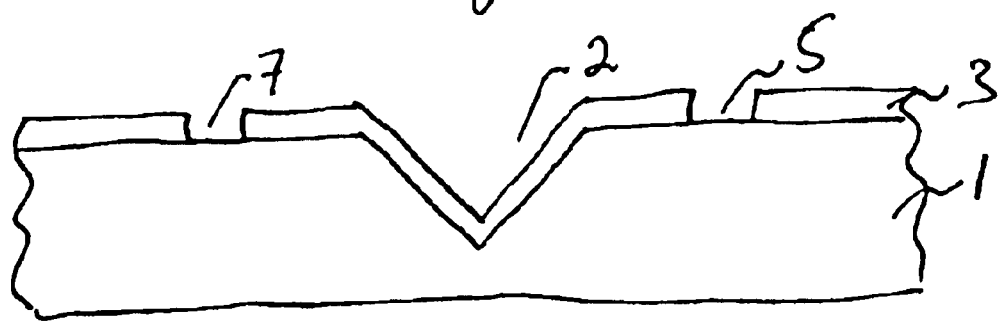
FIG. 3 shows openings patterned in the photoresist adjacent to the V-groove, for one embodiment of the invention.
Figure 4:
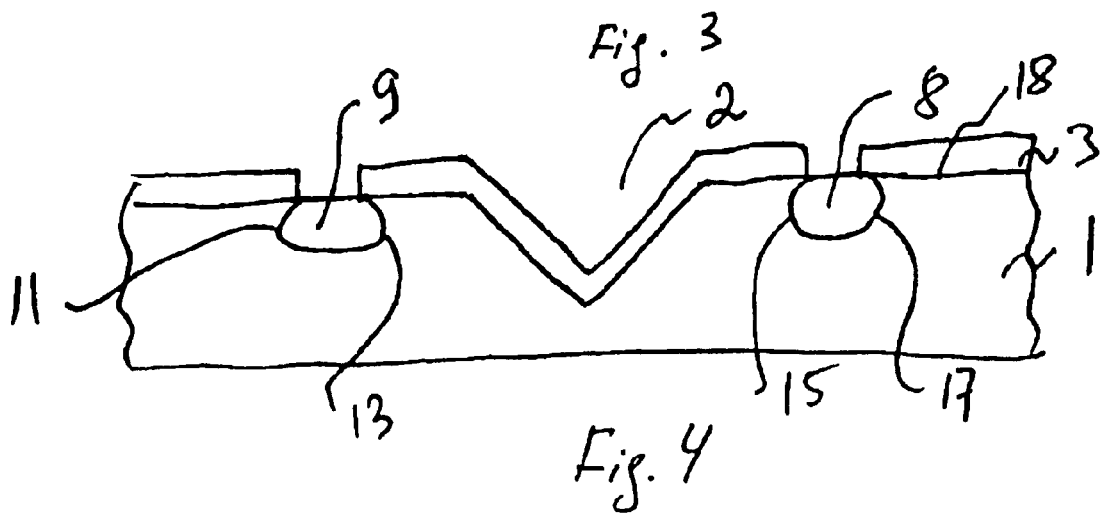
FIG. 4 shows reentrant shapes formed by isotropic etching adjacent to the V-groove, for one embodiment of the invention.
Figure 5:
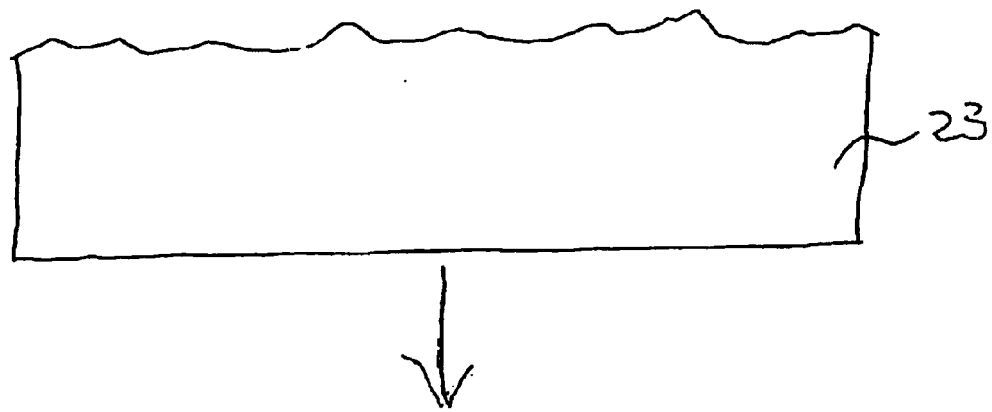
FIG. 5 shows the substrate with photoresist removed and with an optical fiber resting in the groove, above the substrate is a polymer preform or tape and above the polymer is a heated or ultrasonic platen that presses down on the polymer, for one embodiment of the invention.
Figure 5:
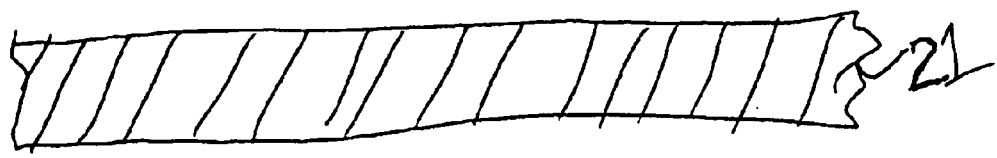
Figure 5:
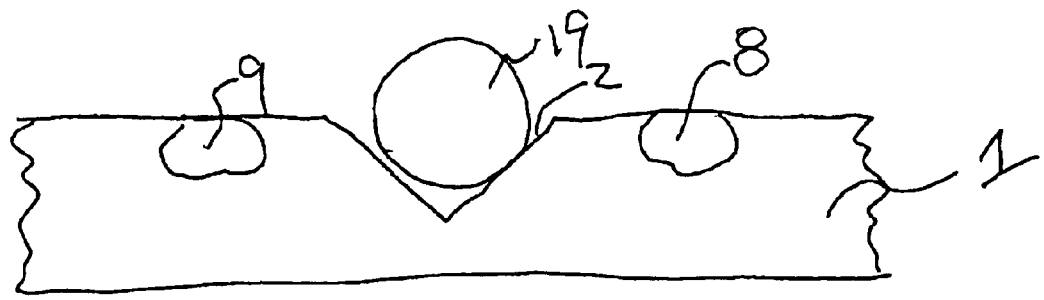
Figure 6:
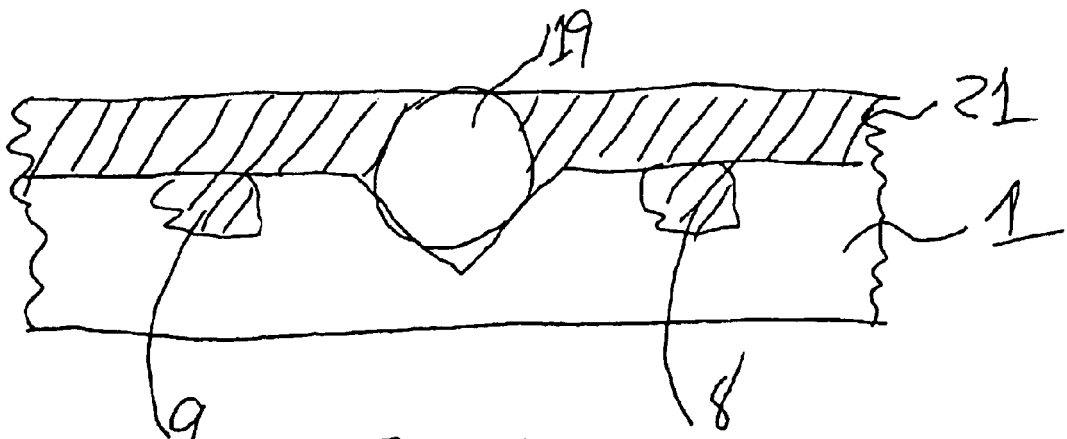
FIG. 6 shows that the polymer has flowed around and encapsulated the fiber and connected the fiber to the reentrant shapes, for one embodiment of the invention.

Turning now to the drawing, where like reference numerals refer to like elements throughout, FIG. 1 shows a substrate 1, with a V-groove 2, for one embodiment of the invention. FIG. 2 shows the substrate 1 with a layer of deposited photoresist 3, while FIG. 3 shows openings 5 and 7 patterned in the photoresist 3 adjacent to the V-groove 2. FIG. 4 shows reentrant shapes 8 and 9 having undercut regions 15, 17 and 11, 13 respectively formed by isotropic etching adjacent to the V-groove 2. FIG. 5 shows the substrate 1 with photoresist (not shown) removed and with an optical fiber 19 resting in the V-groove 2, above the substrate 1 is a polymer tape 21 and above the polymer tape 21 is a heated platen 23 that presses down on the polymer tape 21. FIG. 6 shows that the polymer tape 21 has flowed around and encapsulated the fiber 19 and connected the fiber to the reentrant shapes 8 and 9.

In another embodiment of the invention, the reentrant shapes are used to improve the adhesion of conventional adhesives that are applied as liquids, such as epoxies and UV-cured acrylics, for example.

In another embodiment of the invention, the reentrant shapes are created before the V-grooves are made.

What is claimed is:

1. An optical fiber device, comprising:

at least one optical fiber over a substrate;

at least one reentrant shape in the substrate adjacent to the optical fiber, wherein at least a portion of the reentrant shape, in cross-section, has a width that increases in a depthwise direction of the reentrant shape; and a polymer that at least partially encapsulates the optical fiber and attaches the optical fiber to the at least one reentrant shape.

2. The optical fiber device of claim 1, wherein the substrate is a silicon substrate.

3. The optical fiber device of claim 2, wherein the substrate is a 100 silicon substrate.

4. The optical fiber device of claim 1, wherein the optical fiber is disposed in a groove in the substrate.

5. The optical fiber device of claim 4, wherein the groove is a V-groove or a U-groove.

6. The optical fiber device of claim 1, wherein the polymer fills the reentrant shape.

7. The optical fiber device of claim 1, wherein a plurality of reentrant shapes are present in the substrate.

8. The optical fiber device of claim 1, wherein the polymer is in contact with the optical fiber.

9. The optical fiber device of claim 8, wherein the polymer fills the reentrant shape.

10. The optical fiber device of claim 1, further comprising reentrant shapes on an undersurface of the substrate.

11. A method of forming the optical fiber device of claim 1, comprising:

(a) providing a substrate;

(b) forming at least one reentrant shape in the substrate;

(c) providing at least one optical fiber over the substrate; and (d) attaching the optical fiber to the at least one reentrant shape with a polymer.

12. The method of claim 11, wherein the reentrant shape in the substrate is formed by isotropically etching the substrate.

13. The method of claim 11, wherein in (d) the polymer is disposed over the fiber and in the reentrant shape.

14. The method of claim 13, wherein in (d) the polymer is heated after disposing the polymer over the fiber and in the reentrant shape.

15. The method of claim 11, wherein the polymer is a thermoplastic tape or a thermoset B-stage preform.

16. The method of claim 11, wherein die substrate is a silicon substrate.

17. The method of claim 11, further comprising forming a groove in the substrate, wherein the optical fiber is disposed in the groove.

18. The method of claim 11, wherein the polymer fills the reentrant shape.

19. The method of claim 11, wherein a plurality of reentrant shapes are present in the substrate.

20. The method of claim 11, wherein the polymer is in contact with the optical fiber.

* * * * *